US008821108B2

(12) United States Patent
Nayebi et al.

(10) Patent No.: US 8,821,108 B2
(45) Date of Patent: Sep. 2, 2014

(54) METHOD OF CONTROLLING A WIND POWER PLANT

(75) Inventors: Kouroush Nayebi, Ikast (DK); Eik Herbsleb, Odder (DK)

(73) Assignee: Vestas Wind Systems A/S, Aarhus N. (DK)

( * ) Notice: Subject to any disclaimer, the term of this patent is extended or adjusted under 35 U.S.C. 154(b) by 829 days.

(21) Appl. No.: 13/001,257

(22) PCT Filed: Jun. 30, 2009

(86) PCT No.: PCT/EP2009/058157
§ 371 (c)(1),
(2), (4) Date: Apr. 8, 2011

(87) PCT Pub. No.: WO2010/000723
PCT Pub. Date: Jan. 7, 2010

(65) Prior Publication Data
US 2011/0182712 A1     Jul. 28, 2011

Related U.S. Application Data

(60) Provisional application No. 61/076,944, filed on Jun. 30, 2008.

(30) Foreign Application Priority Data

Jun. 30, 2008    (DK) ................................ 200800913

(51) Int. Cl.
*F03D 7/02*      (2006.01)
(52) U.S. Cl.
USPC .............................................. 415/40; 415/37

(58) Field of Classification Search
USPC ............ 415/1, 17, 118; 416/1, 37, 40, 41, 61, 416/DIG. 4; 290/44, 55; 700/287
See application file for complete search history.

(56) References Cited

U.S. PATENT DOCUMENTS 4,155,252 A *   5/1979   Morrill ....................... 73/170.08
6,946,751 B2 *   9/2005   Yoshida et al. ................. 290/44
(Continued)

FOREIGN PATENT DOCUMENTS

DE     202006015047 U1   12/2006
EP          1672778 A2   6/2006
(Continued)

OTHER PUBLICATIONS

European Patent Office, International Search Report issued in related International Application No. PCT/EP2009/058157 dated Apr. 12, 2010.

(Continued)

*Primary Examiner* — Ned Landrum
*Assistant Examiner* — Liam McDowell
(74) *Attorney, Agent, or Firm* — Patterson & Sheridan, LLP

(57) ABSTRACT

It is presented a method for controlling the instantaneous power output from a wind power plant. Wind speed and wind directions are determined, wherein an upper limit power output for the specific wind speed and wind direction is determined from a previously measured power output value at the same wind speed and wind direction, and wherein the power output of the wind power plant is controlled based on the determined upper limit power output. A wind power plant is also presented.

30 Claims, 10 Drawing Sheets

(56) References Cited

U.S. PATENT DOCUMENTS

| | | |
|---|---|---|
| 7,099,800 B2 * | 8/2006 | Henriksen et al. ............ 702/187 |
| 8,068,939 B2 * | 11/2011 | Schmidt ........................ 700/297 |
| 8,202,048 B2 * | 6/2012 | Stiesdal et al. .................... 416/1 |
| 2003/0127862 A1 | 7/2003 | Weitkamp |
| 2007/0035135 A1 * | 2/2007 | Yoshida .......................... 290/44 |
| 2007/0067067 A1 * | 3/2007 | Stommel ...................... 700/287 |
| 2007/0090651 A1 | 4/2007 | Wobben |
| 2007/0124025 A1 * | 5/2007 | Schram et al. ................ 700/287 |
| 2007/0193744 A1 * | 8/2007 | Bridges ...................... 166/272.1 |
| 2008/0079263 A1 * | 4/2008 | Morjaria et al. ................ 290/44 |
| 2008/0112807 A1 * | 5/2008 | Uphues et al. .................... 416/1 |
| 2009/0146424 A1 * | 6/2009 | Kammer et al. ................ 290/44 |
| 2009/0295160 A1 * | 12/2009 | Wittekind et al. .............. 290/44 |
| 2011/0182712 A1 * | 7/2011 | Nayebi et al. ................... 415/15 |

FOREIGN PATENT DOCUMENTS

| | | |
|---|---|---|
| EP | 1918581 A2 | 10/2007 |
| EP | 1906353 A1 | 4/2008 |
| WO | 0133075 A1 | 5/2001 |
| WO | 03030329 A1 | 4/2003 |

OTHER PUBLICATIONS

Australian Government—IP Australia, first examination report issued in related Australian Patent Application No. 2009265720 dated Apr. 29, 2011.

* cited by examiner

METHOD OF CONTROLLING A WIND POWER PLANT

TECHNICAL FIELD

The present invention relates to a method of controlling a wind power plant and to a computer program for carrying out said method when running on a computer.

TECHNICAL BACKGROUND

The power demand in a grid varies over time. For different times of a day, varying power output into the grid is needed in order to meet the power consumption demands.

For synchronous generation power plants (like thermal or nuclear ones), the power injected into the grid at a specific time is easily controlled.

However, for wind power plants, the unpredictable nature of the wind renders it more difficult to control the power output from these plants at a given time.

It is known to use diesel generators in the grid for short injections of power into the grid at times needed to stabilize e.g. grid frequency. However, the usage of diesel generators is a supplementary cost and it can not be seen as an environmental friendly alternative.

WO 03/030329 discloses a method for operating a wind park. The wind park is connected to an electric supply network into which the power produced by the wind park is fed. At least one of the wind power plants of the wind park is provided with a control input which is used to adjust the electric power of the wind park or one or several of the individual wind plants in the park within a range of 0-100% of the respectively provided power.

However, a problem with this solution is that the nominal power of a wind power plant is used, which may not be reached in reality.

SUMMARY OF THE INVENTION

A general object is to provide enhanced control of power output of wind power plants.

Another object is to provide a method that will provide data to link wind speed and wind direction to a forecasted potential power output of a wind power plant.

Another object is to provide a method that will provide updated data to link wind speed and wind direction to a forecasted potential power output of a wind power plant.

Another object is to provide a method that allows to operate a wind power plant in a curtailed way, then allowing to create a power buffer that may be used by the grid to which the power plant is connected to.

This and further objects will be described further below.

According to a first aspect of the present invention there is provided a method for controlling the instantaneous power output from a wind power plant, the method comprising:
    determining a wind speed and a wind direction,
    providing a data structure comprising at least one previously determined power output value of the wind power plant at said wind speed in said wind direction,
    determining an upper limit power output by means of the at least one previously determined power output value, and
    controlling the instantaneous power output based on said determined upper limit power output.

An effect, which may be obtainable thereby, is injection of extra power into the grid, i.e. the wind power plant can provide a power buffer and thereby stabilizing a grid frequency, stabilize power pending and reducing flicker. This may be possible because the instantaneous power output may be lower than the capacity of the wind power plant (curtailing). Injection of extra power into the power grid by a wind power plant may emulate the inertia response of a synchronous generator, which is usually used in the conventional power plants.

In an embodiment, the step of determining a wind speed in a wind direction, and the step of providing a data structure comprising at least one previously determined power output value of the wind power plant at said wind speed in said wind direction, is done when the wind power plant operates at an upper limit capacity.

In an embodiment, the step of controlling is carried out by curtailing the output power of the wind power plant.

In an embodiment, the step of determining an upper limit power output by means of the at least one previously determined power output value is done by measuring a second wind speed and a second wind direction, and retrieving the corresponding power output value previously stored in the data structure and corresponding to said second wind speed and said second wind direction.

Following an embodiment, in this aspect of the invention, there is:
  a process of filling a data structure, advantageously when the wind power plant operate at an upper limit capacity (i.e. in a non-curtailed way), a power output value from the wind power plant (in another embodiment from each wind turbine comprised in the wind power plant) is measured together with a first wind speed and a first wind direction, and this power output value is stored associated to a first range of wind speeds, where the first wind speed measured is included, and to a first range of wind directions where the first wind direction is included, and
  a process of running the wind power plant in a controlled way, notably curtailed way, wherein a second wind speed and a second wind direction are measured and it is then possible to retrieve an earlier stored power output value corresponding to a second wind speed range, including such a second wind speed, and a second wind direction, including such a second wind direction: this stored power output value corresponds then to an expected upper limit power output for this second wind speed range and this second wind direction range; then the instantaneous power output of the power plant can be controlled based on this expected upper limit power output for this second wind speed range and this second wind direction range, for example by running the wind power plant in a curtailed way in relation to this expected upper limit power output for this second wind speed range and this second wind direction range.

In an embodiment, the first process can be carried out from time to time if there is a wish to maintain the data structure updated.

The data structure may be a matrix in which at least one measured power output is stored as a matrix element associated to the wind speed and the wind direction.

An effect, which may be obtainable thereby, is a structured way of collecting power output data, which may be memory efficient.

The step of determining a wind direction may further comprise associating the wind direction to a wind direction interval (that may be called sector) comprising said wind direction.

An effect which may be obtainable thereby is that when storing measured power output values, a smaller matrix may be used due to less possible values of wind directions and thereby saving memory.

The step of determining a wind speed may further comprise associating the wind speed to a wind speed interval comprising said wind speed.

An effect which may be obtainable thereby is that when storing measured power output values, a smaller matrix may be used due to less possible values of wind directions and thereby saving memory.

An embodiment may further comprise measuring a power output value associated with the wind speed and the wind direction, and storing the measured power output value in a data structure, the measured power output value being associated with the wind speed and the wind direction.

Generally, this power output value is the power output that the wind power plant delivers with this wind speed and this wind direction when there is no control in order to reduce it. This power output value is then generally also the upper limit power output of the wind power plant with this wind speed and this wind direction.

Effects, which may be obtainable thereby, is knowing an upper power limit for local wind conditions for a certain wind power plant. Due to geographical reasons, power output of the wind power plant, when installed at its location, may not be the same as specified by e.g. a manufacturer.

Thanks to the step of controlling, in one embodiment, it may be possible to make the wind power plant deliver an instantaneous power output, lower than the upper limit power output, i.e. the available power in the wind for a certain wind speed and a certain wind direction, with respect to the available power in the wind. This instantaneous power output may be more or less constant depending on the control.

An embodiment may comprise repeating the step of determining a wind speed and a wind direction, and the step of measuring a power output value associated with the wind speed and the wind direction, and the step of storing the measured power output in a data structure, the measured power output being associated with the wind speed and the wind direction.

Advantageously, in an embodiment, the power output value(s) corresponding to a wind speed and/or to a wind speed range and to a wind direction and/or a wind direction range, are then updated when similar wind conditions apply on the wind power plant. Then, if conditions of the wind power plant changes (like for example trees growing near it or presence of dust on the blades), the data structure gets updated.

An embodiment may further comprise computing an average of the plurality of power output values.

An effect, which may be obtainable thereby, is that an average may better describe how much the upper limit power output in fact is.

The step of measuring a power output value may be at a substation level of the wind power plant (this substation being the at least one linking the wind power plant to the grid). The step of determining a wind speed and a wind direction may also be at a substation level of the wind power plant.

An effect, which may be obtainable thereby, is determining and measuring local wind conditions in one place, values then being comparable.

An embodiment may further comprise the step of replacing a previously measured power output value associated to a wind speed and a wind direction with a current measured power output value associated to a substantially same wind speed and to a substantially same wind direction.

Substantially may here mean that the two wind speeds may be included in the same defined range and the two wind directions may be included in the same defined range.

An effect, which may be obtainable thereby, is to continuously update power output values with respect to wind conditions. For instance, changing environmental conditions may influence the power output of the wind power plant, resulting in different power output from the wind power plant for the same wind conditions.

The controlling a power output may comprise controlling the pitch of rotors of at least one wind turbine of the wind power plant and/or modifying (for example decreasing) the set up point of at least one wind turbine of the wind power plant. The set up point is the power value around which a wind turbine is supposed to run. For example, a 2 MW wind turbine may have a set up point at 2 MW, but this set up point can be decreased for example to 1.5 MW.

An embodiment may further comprise receiving a desired power output to fix the instantaneous power output.

According to a second aspect of the present invention there is provided a wind power plant comprising:
 a wind speed sensor and a wind direction sensor (it may be a unique sensor for both speed and direction or two different ones) arranged to measure a wind speed and a wind direction,
 a storage component arranged to store measured power output values of the wind power plant, each power output value being generated by the wind power plant, each power output value being associated with wind speed and wind direction,
 a controller arranged:
  to retrieve, from the storage component, an upper limit power output value associated with a wind speed and a wind direction, said upper limit power output value being determined from at least one stored measured power output value associated with the wind speed and the wind direction, and
  to control an instantaneous power output based on the upper limit power output value.

The wind power plant may further comprise a control unit arranged to associate the wind direction to a wind direction interval comprising said wind direction.

The upper limit power output value may be the measured power output value when there is no control in order to decrease it.

According to a third aspect of the present invention there is provided a method for collecting local wind data for control of power output of a wind power plant, the method comprising:
 determining a wind speed and a wind direction, the wind speed and wind direction representing the wind speed and wind direction that the wind power plant is subject to,
 determining an associated wind direction interval comprising said wind direction,
 determining a power output value of the wind power plant associated with the wind speed and wind direction interval, and
 storing the power output value in an element of a matrix data structure, the element being associated with the determined wind speed and wind direction interval.

Effects, which may be obtainable thereby, is knowing an upper power limit for local wind conditions for a certain wind power plant. Due to geographical reasons, power output of the wind power plant, when installed at its location, may not be the same as specified by e.g. a manufacturer.

In an embodiment, the step of determining a wind speed and a wind direction, and the step of determining a power output value of the wind power plant associated with the wind speed and wind direction interval, is done when the wind power plant operates at an upper limit capacity.

An embodiment may further comprise the step of determining an associated wind speed range comprising said wind speed.

An embodiment may further comprise controlling, notably curtailing, the wind power plant based on the determined power output value.

Then, in an embodiment, it may be possible to deliver a more or less constant instantaneous power output from the wind power plant, lower than the upper limit power output, i.e. the available power in the wind for a wind speed and wind direction.

According to a fourth aspect of the present invention there is provided a computer program stored on a computer-readable storage medium, which when executed on a processor performs the method according to the first and/or the third aspect of the present invention.

According to a fifth aspect of the present invention, there is provided a data carrier comprising a computer program product for carrying out any embodiment of a method according to the first and third aspect of the invention, when said computer program product is run on a computer.

According to a sixth aspect of the present invention there is provided an electronic device having digital computer capabilities arranged to perform the method according to the first and/or the third aspect of the present invention.

Measurement on wind speed, wind direction and on power output value may be done on a spot value of the wind speed, the wind direction and the output power value at a specific time or by averaging during a certain period of time (for example 1 s, 10 s, 1 min or 1 hour) at least one of the wind speed and/or the wind direction and/or the power output value. Spot values may be taken for the non-averaged data, when just one or some or them are averaged.

Additional possible features and preferred embodiments are set out in the dependent claims and disclosed in the following.

BRIEF DESCRIPTION OF THE DRAWINGS

The invention and further advantages will now be described by way of non-limiting embodiments, with reference to the accompanying drawings.

DETAILED DESCRIPTION

Figure 1:
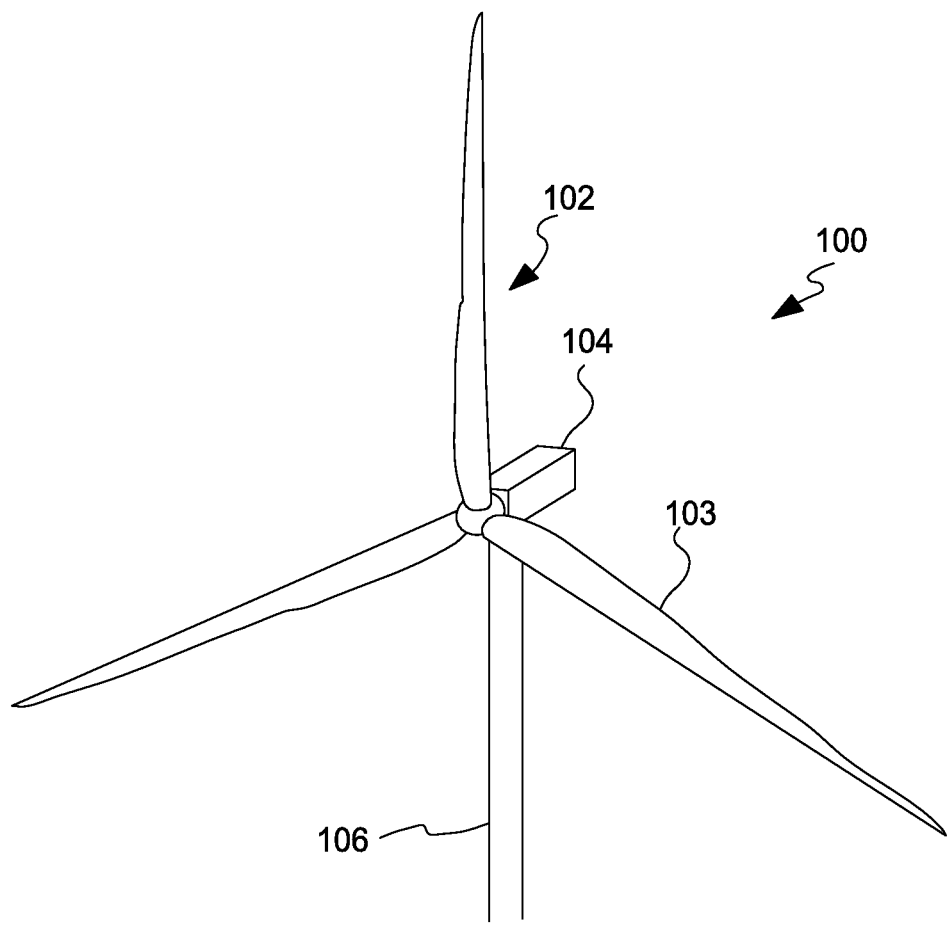
FIG. 1 is an example perspective view of an example of a wind turbine.

FIG. 1 is a perspective view of an example of a wind turbine 100. The wind turbine 100 comprises a rotor 102, a nacelle 104 and a tower 106. The rotor 102 usually comprises two or three rotor blades 103. The rotor blades 103 can be manufactured of e.g. glass fiber reinforced plastics or carbon fiber. Usually, the rotor blades 103 can be pitched, i.e. the angle of the rotor blades 103 can be altered in a longitudinal direction of the rotor blades 103 by a pitch mechanism (not shown), for example in case of too high wind speeds.

None of the components comprised within the nacelle 104 are illustrated in FIG. 1, however, the nacelle 104 can comprise a gearbox for gearing up a rotor speed generated by the rotor 102.

The wind turbine 100 can either operate at fixed speed or variable speed. If the wind turbine 100 is of a variable speed type, a generator housed within the nacelle 104 is controlled by power electronic equipment.

The generator can e.g. be an asynchronous generator, i.e. an induction generator, which is coupled to the electric grid via a transformer. The induction generator can for instance be a DFIG (Doubly-Fed Induction Generator), in which case the stator of the generator is coupled to the power grid and the rotor of the generator is coupled to power electronic equipment. The generator is coupled to a transformer, the transformer being in connection with the power grid.

An anemometer (not shown) can be mounted on the nacelle 104 for measuring e.g. wind speed for determining wind speed and wind direction at the wind turbine 100. Besides influences from normal meteorological factors, the wind speed can vary depending on e.g. the height of the tower 106 on which the nacelle 104 is arranged.

Figure 2:
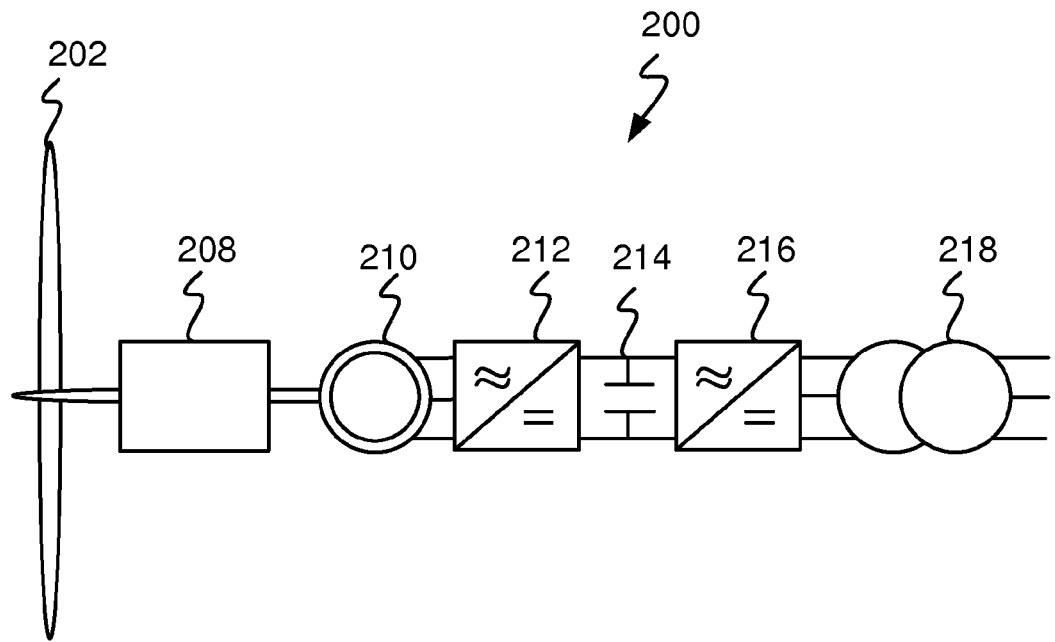
FIG. 2 is a schematic diagram of a wind turbine.

FIG. 2 is a schematic diagram of a wind turbine 200. The wind turbine 200 comprises a rotor 202, a gearbox 208, a generator 210, e.g. an induction generator or a synchronous generator, a generator side power electronic converter 212, a dc-link capacitor 214, a grid-side power electronic converter 216 and a transformer 218.

The gearbox 208 gears up a rotational speed of the rotor 202 to a suitable speed for the generator 210 e.g. 1500 rpm for a 50 Hz grid. The power electronic converters 212 and 216 can control the rotational speed of the generator 210 (can be e.g. torque or power control), enabling a variable speed wind turbine 200.

Figure 3:
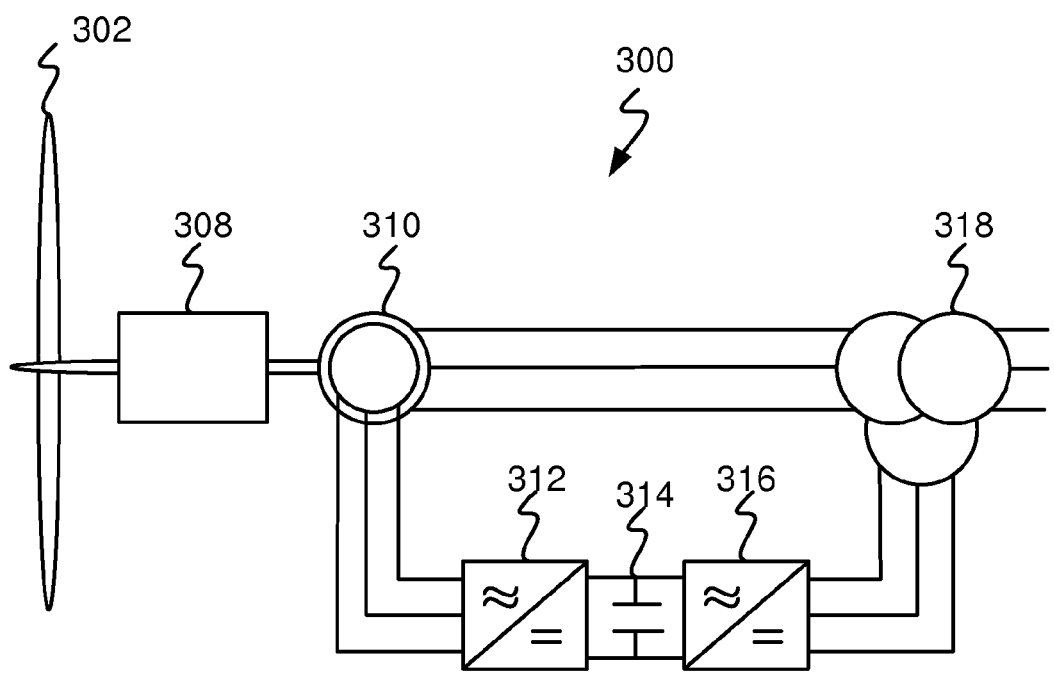
FIG. 3 is a schematic diagram of a wind turbine.

FIG. 3 is a schematic diagram of a wind turbine 300. The wind turbine 300 is of variable speed DFIG type. The wind turbine 300 comprises a rotor 302, a gearbox 308, a doubly fed induction generator (DFIG) 310, a generator side power electronic converter 312, a dc-link capacitor 314, a grid-side power electronic converter 316 and transformers 318.

The generator side power electronic converter 312 is connected to a rotor of the DFIG 310. The power grid is, via the transformers 318, directly connected to a stator of the DFIG 310. This configuration provides less losses in the power electronic converters 312 and 316 since they do not have to handle the full effect from the DFIG 310.

Figure 4:
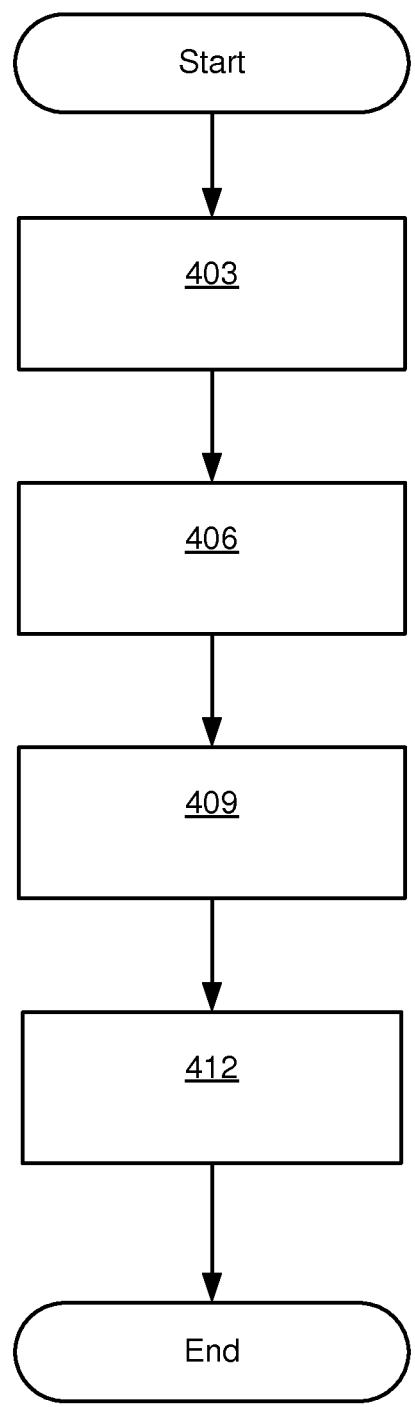
FIG. 4 is an embodiment of a method of controlling power output of a wind power plant according to the invention.

FIG. 4 is an embodiment of a method of controlling power output of a wind power plant according to the invention. The method is not limited to carrying out the steps in the below order.

In step 403 a wind speed is determined, as well as a wind direction associated with the wind speed. The wind speed and wind direction can be determined by a wind speed sensor such as an anemometer located in a position close to the wind power plant (also called wind park), like for example a substation that links the wind power plant to the grid. 'Close' means that the location is subjected to substantially the same wind conditions than the wind power station.

Wind directions can be divided into sections, so that the wind directions in a horizontal plane is divided into sectors, e.g. 12-18 sectors. For example, if the wind directions are divided into 18 sectors, the wind directions 0-20 degrees can correspond to sector one, the wind directions 21-40 degrees can correspond to sector two and so on. Hereinafter, this process will be referred to as quantization of the wind direction into a wind direction interval. The wind directions can be defined relative to e.g. the point of compass, so that for example north can define the degree 0 and thus accounts to sector one according to the above example.

The determined wind speed can be associated with a wind speed interval, e.g. 0.5 m/s, so that all wind speeds between 5.0 m/s and 5.5 m/s are seen as wind with the speed 5 m/s. Other intervals, such as 0.1 m/s or 1 m/s are, however, equally possible within the scope of the invention.

In an embodiment a common wind speed sensor can be used for the entire wind power plant. Thus, when a wind speed is detected at the wind speed sensor, the power of the wind for this wind power plant can be determined, as will be described in more detail below. Alternatively, a wind speed sensor can be provided at each wind turbine of the wind power plant. In an embodiment, the determined wind speed can be provided by a meteorological station.

In step 406 a data structure is provided. The data structure can be of matrix type, as will be described below with reference to FIG. 7. Previously determined wind speeds and wind directions can in this data structure be associated with corresponding measured power output values of the wind power plant, advantageously measured when the wind power plant operates at an upper limit capacity.

In step 409, it is determined what upper limit power output the wind power plant can deliver to the grid with respect to the present wind conditions, i.e. the measured wind speed and wind direction.

In most situations it is adequate to correlate the measured wind speed to the output power of the wind power plant. However, an even better correlation between the output power from the wind power plant and the current weather conditions may be established by analyzing the wind power in a stream channel whose cross-sectional area is equal to the area swept by the blades of a wind turbine. More specifically, the wind power in a channel of area A is $$P = \frac{\rho A v^3}{2}$$

where $\rho$ is the air density and $v$ is the wind speed in the direction of the wind turbine axis at the plane of the wind turbine blades. Thus for a given size of the wind turbine, the output power relates to the moving mass of the air passing by the blades of the wind turbine.

The density of the air may be calculated using the ideal gas law, taking the vapor pressure of water into account $$\rho = \frac{p - p_v}{R_d * T} - \frac{p_v}{R_v * T}$$

In the equation above, $\rho$ is the absolute pressure, $p_v$ is the vapor pressure of water, $R_d$ is the specific gas constant for dry air (287,05 J/kgK), $R_v$ is the specific gas constant for vapor (461,50 J/kgK) and T is the absolute temperature. The vapor pressure of water may be estimated from the saturation vapor pressure (e.g. derived by use of the Goff-Gratch equation) and the relative humidity of the air. The calculation of the vapor pressure of water may be done in real time or may be done in advance and stored in a look-up table in a memory in the wind power plant. If a small error in the calculation is acceptable, a simplified formula for estimating the vapor pressure of water may be used according to $$p_v = \varphi * 6,1078 * 10^{\frac{7,5*T-2048,625}{T-35,85}}$$

where $\phi$ is the relative humidity of the air and T is the absolute temperature. Consequently, in addition to measuring the wind speed and wind direction, by also measuring the temperature and the relative humidity (or the specific humidity related to the relative humidity by the expression: $x=0.622\phi\rho_{ws}/(\rho-\rho_{ws})$ 100%, where x is the specific humidity of air vapor mixture (kg/kg), $\phi$ is the relative humidity (%), $\rho_{ws}$=density of water vapor (kg/m3), and $\rho$ is the density of the moist or humid air (kg/m3)) of the air in the vicinity of the wind power plant, the moving mass of the air passing by the wind turbine may be estimated thereby increasing the correlation between an actual weather condition (i.e. not only the wind conditions) and the output power from the wind power plant.

In one embodiment the status (i.e. active or disconnected) of each wind turbine in the wind power plant is retrieved from a controller in the wind power plant and is taken into account when measuring the output power from the wind turbines. Normally, the wind turbines in a wind power plant are arranged on a limited geographical area, which implies that for certain wind directions a first set of wind turbines will experience a shadowing effect from a second set of wind turbines standing in front of the first set of wind turbines in the direction of the wind. The shadowing effect will appear as a lower power output from the first set of wind turbines compared to the second set of wind turbines even though they are exposed to analogous weather conditions. By measuring the output power from a wind turbine while taking the status of the other wind turbines in the plant into account a better correlation between the actual operating conditions of the wind turbines and their output power may be determined.

In one embodiment the upper limit power output determined in step 409 above may correspond to one or more previous power output values of the wind power plant measured when the wind power plant operates at an upper limit capacity. Alternatively the upper limit power output may be determined by filtering previous measurements of the output power under specific weather conditions. The filtering may e.g. be performed by calculating a moving average of previous measurements, i.e. for each wind direction (absolute or quantized as disclosed above) an average value of the output power from the wind power plant is calculated based on previous measurements of the output power. By calculating a moving average rather than storing each measurement value of the output power the required memory space may be reduced.

The filtering may alternatively be performed by applying more complex functions such as calculating an average of only an interior portion of a number of stored values (i.e. calculating the average by excluding a percentage of data points from the top and bottom tails of the output power measurements). The average values may be calculated using any suitable type of averaging function, such as Pythagorean mean, arithmetic mean, geometric mean, harmonic mean etc.

Thus, the expected upper limit power output from the wind power plant may be determined, in contrast to merely knowing the specifications of the wind turbines, as specified by manufacturers of wind turbines, comprised in the wind power plant.

In step 412, the instantaneous power output of the wind power plant is controlled based on the determined upper limit power output.

Figure 5:
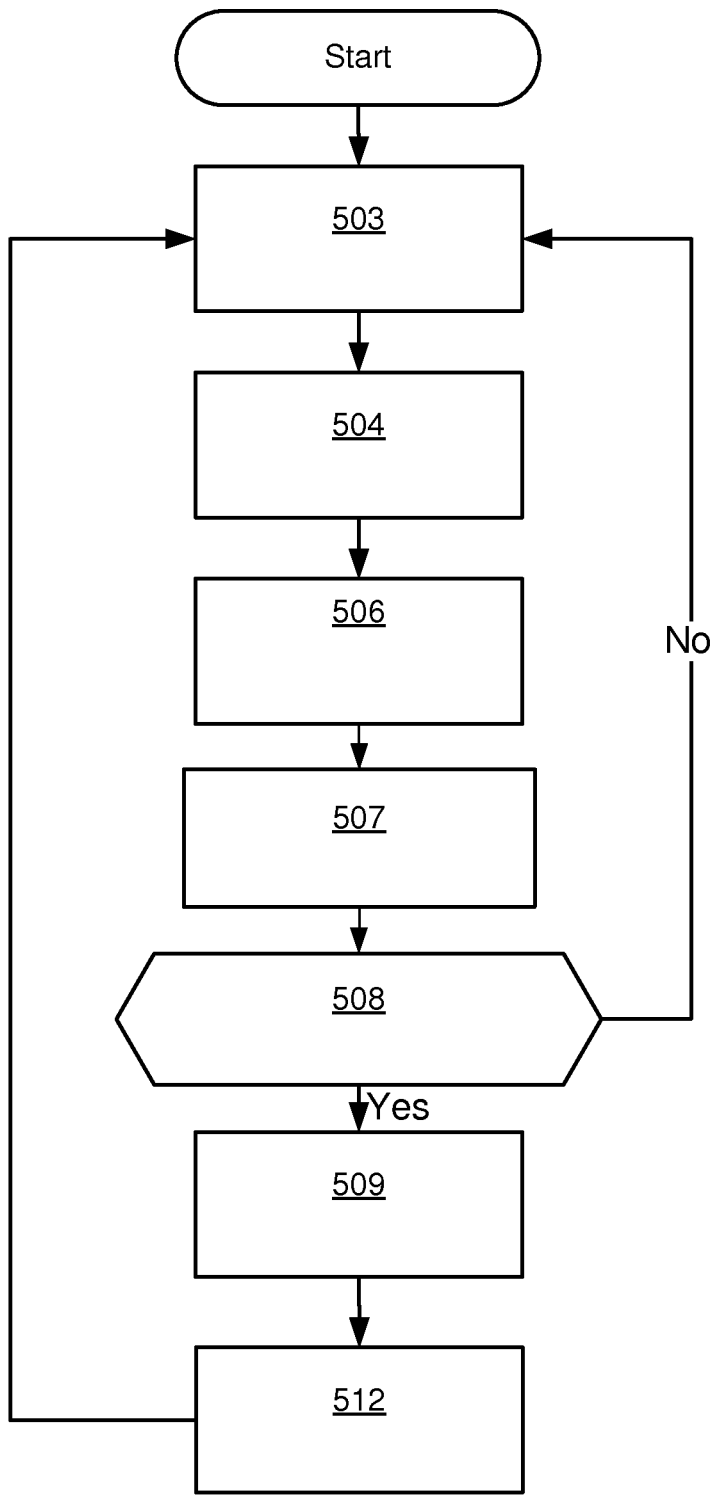
FIG. 5 is a flowchart of a method of controlling power output of a wind power plant according to an embodiment of the invention.

FIG. 5 is a flowchart of a method of controlling power output of a wind power plant according to an embodiment of the invention. The method is not limited to carrying out the steps in the below order.

In step 503, a wind speed is determined as well as a wind direction associated with the wind speed. The wind speed and wind direction can be determined by a wind speed sensor such as an anemometer. Wind directions can be divided into sectors as described above with reference to FIG. 4. The measured wind speed can be associated with a wind speed interval as described above with reference to FIG. 4. Additionally, as indicated above, the humidity and temperature of the air in the wind may be determined by means of a humidity sensor and temperature sensor, respectively, arranged at the wind power plant.

In step 504, a power output value of the wind power plant is measured. The measured power output value is dependent on the determined wind speed and wind direction (and optionally the humidity and temperature), e.g. for a determined wind speed of 7 m/s in wind direction in a sector 10 gives (at a relative humidity of 70% and a temperature of 16° C.), for instance, a power output value of 27 MW from the wind power plant is reached.

It can be possible to measure the power output value for each individual wind turbine and add the measured power output value of each wind turbine.

In step 506, a data structure, such as a data structure of matrix type is provided. The elements of the data structure can comprise previously measured power outputs values from the wind power plant associated with corresponding wind speeds and wind directions.

In step 507, the measured power output value, which is thus dependent on the determined wind speed and wind sector, is stored in the provided data structure. In one embodiment, the data structure is a matrix as will be described in more detail with reference to FIG. 7 below.

In step 508, it is determined whether a desired power output has been received. The desired power output may be a power output level (either a constant one or a variable one, or with a level of curtailment in relation to the upper limit power output (for example, desired power output being 500 kW less than the upper limit), which the wind power plant has been asked to deliver to the power grid or a percentage of the upper limit power output (for example, requirement to run at 80% of upper limit). The desired power output is what the wind power plant is to inject into the grid. The desired power output value can e.g. be provided from a transmission system operator (TSO) wanting to deliver a specific power output into the grid, needed according to demands from users of the grid, or wanting to keep a power buffer (some grid codes require it). It can also be a preprogrammed schedule of different power outputs expected during e.g. the course of a day.

In case a desired power output has not been received, the method continues to the step of measuring a wind speed 503.

In case a desired power output has been received, the method continues to a step of determining an upper limit power output 509.

In step 509, it is determined what upper limit power output the wind power plant can deliver to the grid with respect to the present wind conditions, i.e. the measured wind speed and wind direction. The upper limit power output can be retrieved from the data structure where a previously measured power output value (for the same wind conditions or sharing the same wind speed range and wind direction range), advantageously measured when the wind power plant operates at an upper limit capacity, has been stored.

In step 512, the instantaneous power output of the wind power plant is controlled based on the determined upper limit power output. The wind power plant can be controlled to be in accordance with the desired power output.

For example, if the desired power output is 30 MW and the actual upper limit power output of the wind power plant due to its geographical location and to the wind conditions is 37 MW, wind turbines of the wind power plant will have their outputs controlled or regulated by means of e.g.:

controlling the generator torque or power, or/and pitching or utilizing active stall of rotor blades of at least one wind turbine of the wind power park (for example all of them).

Stopping at least one of the wind turbine of the wind power plant.

Thus, even if the specified power output (by e.g. manufacturer) is 40 MW for a specific wind speed, due to the geographical location, the wind power plant can maximally produce 37 MW in a certain wind direction for that wind speed. According to the invention, it is known what the maximal power output is from the wind power plant for that wind direction and wind speed (37 MW in this example), and therefore it is also known how much control or regulation is needed e.g. how much pitching out is needed in order to produce the desired 30 MW.

If the wind conditions change (for example the wind direction), thanks to the data structure of the invention, the new upper limit power output of the wind power plant is also known (in our example it could be for example 39 MW). Then if the requirement is to keep the same power buffer as before, control or regulation may be adapted (if for example requirement is to keep 7 MW of power, then the wind power plant is controlled to deliver 32 MW instantaneous power output. In another example, the requirement is to keep the instantaneous power output at a certain percentage of the upper limit power output).

Figure 6:
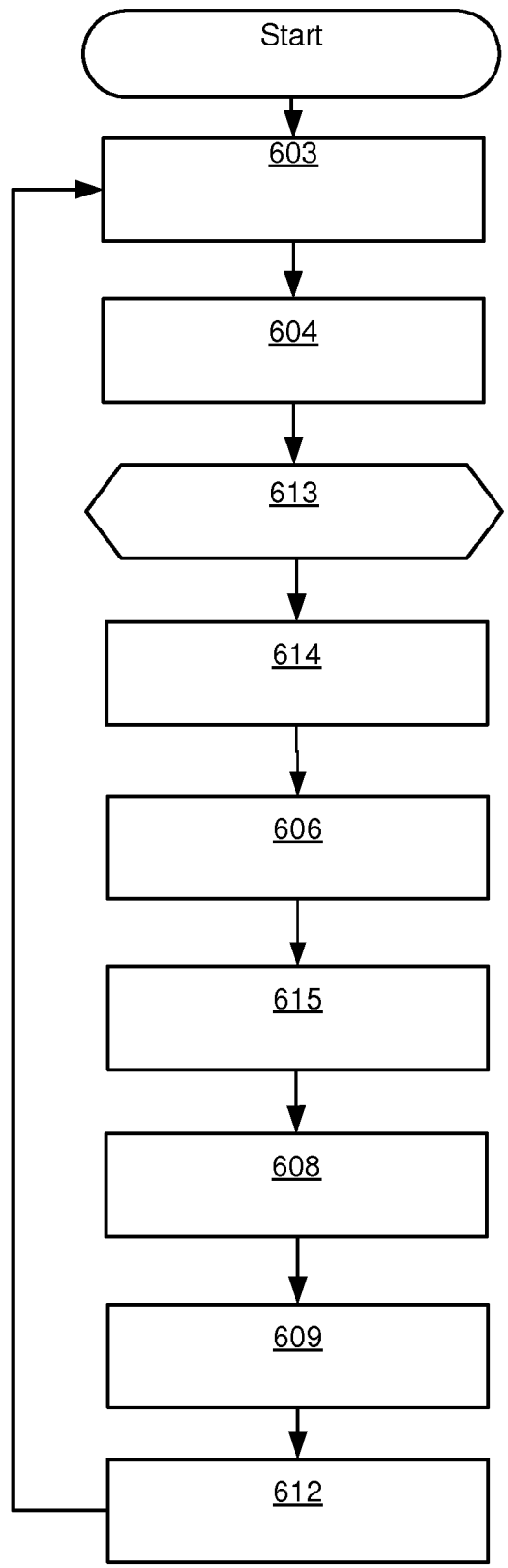
FIG. 6 is a flowchart of a method of controlling power output of a wind power plant according an embodiment of the invention.

FIG. 6 is a flowchart of an embodiment of a method of controlling power output of a wind power plant according an embodiment of the invention. As noted above, the method is not limited to carrying out the steps in the below order.

In step 603, a wind speed and a wind direction of the wind are determined. The wind speed and wind direction can be determined by a wind speed sensor such as an anemometer. Wind directions can be divided into sectors as described above with reference to FIG. 4. The measured wind speed can be associated with a wind speed interval as described above with reference to FIG. 4.

In step 604, a power output value of the wind power plant is measured, advantageously when the wind power plant operates at an upper limit capacity. For example this measurement can take place in at substation level (in the one or several substations linking the wind power plant to the grid).

The measured power output value thus depends on the determined wind speed and wind direction.

It can also be possible to measure the power output for each individual wind turbine and add the measured power output of each wind turbine to a power output of the wind power plant comprising the wind turbines.

In step 613 it is decided whether the step of determining a wind speed and wind direction 603 and the step of measuring a power output value 604 has been carried out less than a predetermined N number of times. N can for instance be 1, 5, 10, 1000, 10000. In case the number of measurements are less or equal to N, the result of the step of determining a wind speed and a wind direction 603 and the result of the step of measuring a power output 604 will be saved without eliminating any past measured power output values.

The measured values can be stored in a temporary memory for later processing.

Measurement on wind and on power output values may be done on a spot value of wind speed, wind direction and output power value at a specific time or by averaging during a certain period of time (for example 1 s, 10 s, 1 min or 1 hour) the wind speed and/or the wind direction and/or the output power value.

In case the number of measurements of power output values is greater than N, then the oldest measurement of power output value is eliminated from the memory and the new one is saved. In an embodiment, each matrix element comprises a vector in which a predetermined number of power output values may be stored, e.g. 1000 power output values.

In step 614 an average of the plurality of measured power output values is calculated for each couple (wind speed, wind direction).

Alternatively, all of the measured power output values are stored in a vector associated with its respective measured wind speed and wind direction, without computing an average of the measured power output until e.g. reading out data in connection with a step 606 below.

In step 606, a data structure, such as a data structure of matrix type is provided. The elements of the data structure can comprise previously measured power outputs from the wind power plant, associated with corresponding wind speeds ranges and wind directions ranges (sectors).

In an embodiment, each element of the matrix may comprise a vector with N elements for the N measurement values of the power output. When carrying out new measurements according to step 604, each oldest power output value of a vector may subsequently be replaced by a new measurement value.

In step 615, the computed average of the measured power output is stored in the data structure.

In another embodiment this average is calculated when needed (stored or not).

In the data structure, the computed average of the measured power output is associated with a wind speed range and wind sector. As noted above with reference to FIG. 5, the data structure can e.g. be a matrix. In time, the data structure will be filled with power outputs values for different ranges wind speeds and ranges of wind directions, i.e. wind sectors, advantageously measured when the wind power plant operates at an upper limit capacity.

Moreover, when a new determination has been made for an existing average wind speed range and wind sector, an old value can be overwritten by the newly measured value according to the first-in-first out principle. Thus, for each wind direction and wind speed, the wind power plant will be able to determine an upper limit power output value which can be delivered to the grid.

In a step 608, the wind power plant receives a desired power output which it is to provide to the grid.

In a step of determining an upper limit power output 609, it is determined what upper limit power output the wind power plant can deliver to the grid with respect to the present wind conditions, i.e. the determined wind speed and wind direction. The determined upper limit power output can be retrieved from a data structure where a previously measured power output value, advantageously measured when the wind power plant operates at an upper limit capacity, has been stored.

In a step 612, the power output of the wind power plant is controlled based on the determined upper limit power output. The wind power plant can be controlled to be in accordance with the desired power output. The wind turbines of the power plant may then have their outputs regulated by means of e.g. controlling torque or power of the generator, or the pitch or utilizing active stall of rotor blades, or at least one of the turbine of the park may be stopped.

When the wind power plant is delivering power according to the desired power output, which can be lower than the upper limit power output (this is called curtailing), the wind power plant may need to switch to the upper limit power output after e.g. a predetermined amount of time for new measurements of the wind speed, wind direction and power output (steps 603 and 604). In an embodiment, the wind power plant will then carry out the steps following steps 603 and 604.

Figure 7:
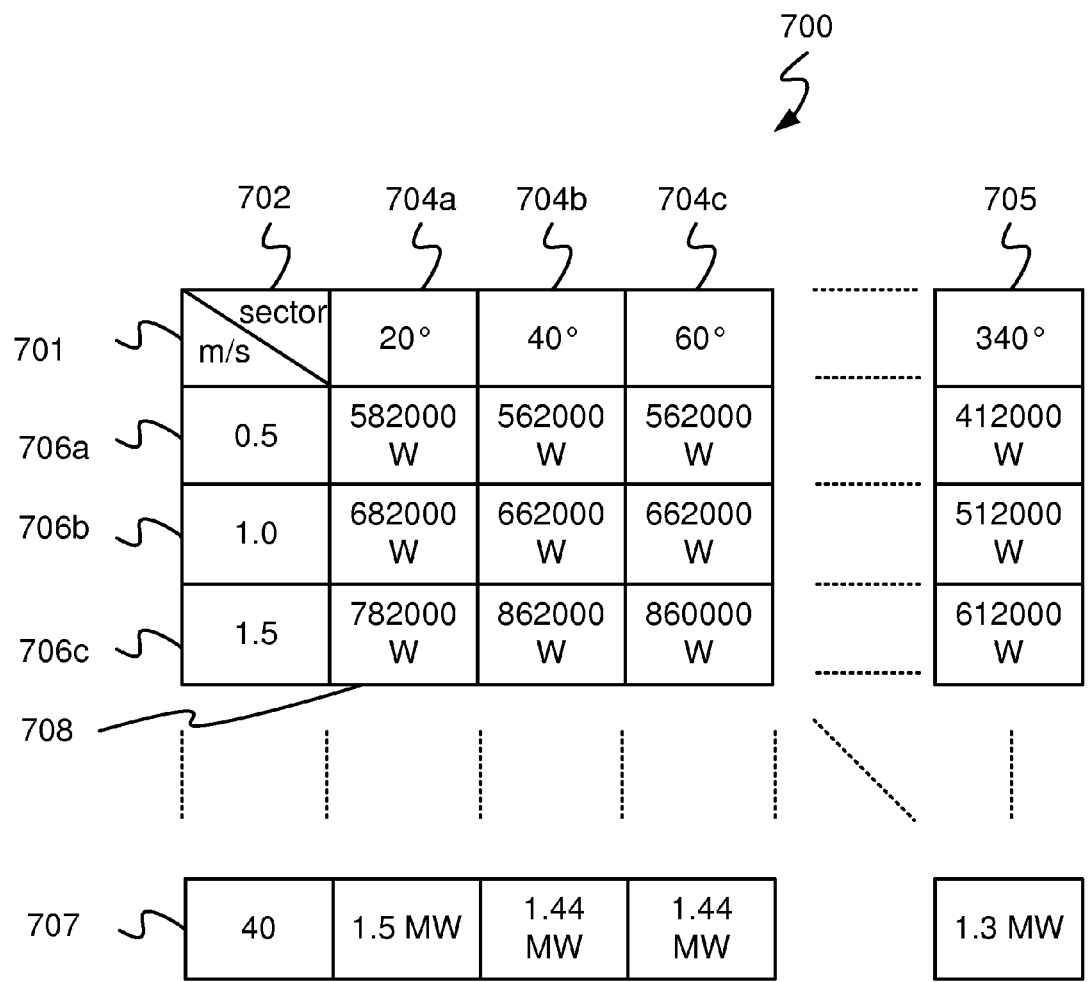
FIG. 7 is a schematic illustration of a matrix data structure according to the invention.

FIG. 7 is a schematic illustration of a matrix data structure according to the invention. The matrix 700 comprises columns 704 *a-c* and 705, each column 704 *a-c* and 705 being associated with a wind sector identified in a first row 701, respectively. In the matrix 700 exemplified in FIG. 7, the first column 702 comprises wind speeds with wind speed intervals of 0.5 m/s. Each row 706 *a-c* and 707 is associated with a specific wind speed interval. Each wind sector comprises an interval of angles, in this example 20 degrees.

Elements in the matrix 700, such as element 708 can comprise measured power output values (N, as defined previously, for example in one embodiment) or in one embodiment, an average of a plurality of measured power output values.

A last row 707 is, in this example 40m/s, the highest wind speeds for which wind turbines are still operating. As can be seen in the different columns 704*a-c* and 705, there are different measured power outputs values for a specific wind speed for different sectors in some cases. This can be due to the geographical variation around a wind power plant. There can, for instance, be a mountain, a forest or a hill adjacent the wind power plant in one direction, which affects a generated power output from the wind power plant with wind blowing from that direction.

For example, in case of the wind turbines being arranged e.g. in a line, power output value from a wind direction perpendicular to this line may be higher than power output value from a wind direction parallel to this line.

In a preferred embodiment, the matrix 700 is created for the globality of the wind power plant.

In another embodiment, the matrix 700 is created for each wind turbine of the wind power plant. This may provide for a better understanding of which wind turbines are mostly affected by geographical variations, and in which case torque or power control, or pitch control or active stall control can be individually applied to each wind turbine for better control.

Figure 8:
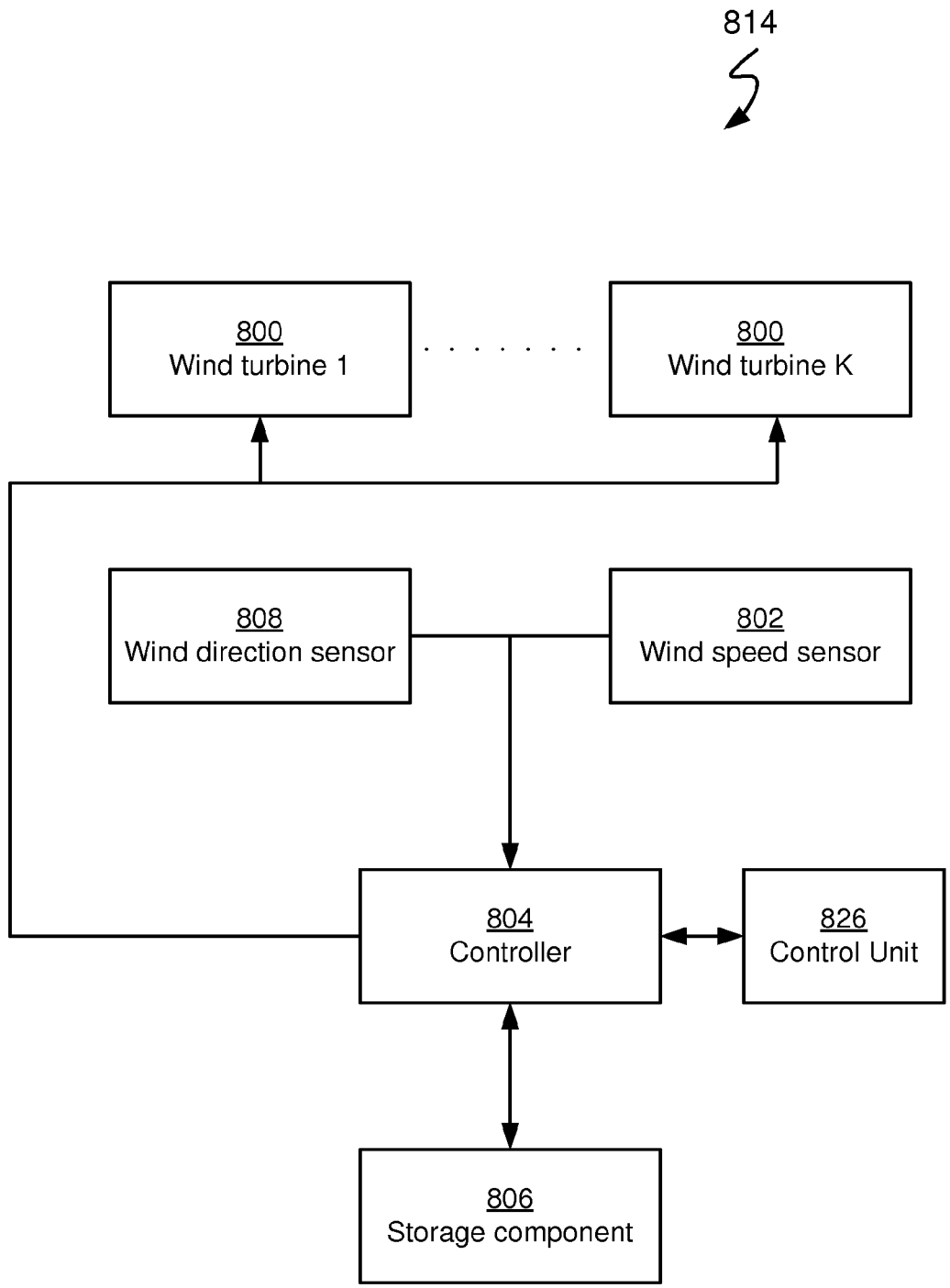
FIG. 8 is a block diagram of a wind power plant according to an embodiment of the invention.

FIG. 8 is a block diagram of a wind power plant according to an embodiment of the invention. The wind power plant 814 comprises a plurality of wind turbines 800, a wind direction sensor 808, a wind speed sensor 802, a controller 804, and a storage component 806.

The wind direction sensor 808 and the wind speed sensor 802 can be housed within one device, such as an anemometer. The wind direction sensor 808 and the wind speed sensor 802 measures wind direction and wind speed. The wind direction sensor 808 can be provided at a substation belonging to the wind power plant 814 and linking the wind power plant to the grid.

This information is then provided to the controller 804, that can also be located in the same substation. The controller can retrieve previously stored information from the storage component 806 regarding an upper limit power output for the measured wind speed and wind direction. The controller 802 may also be also arranged to receive desired power output values from an external source such as a TSO. A control unit 826 can be connected to the controller 802, receiving information from the wind direction sensor 808 and wind speed sensor 802. The control unit 826 can quantize the measured wind speed and wind direction as described with reference to FIG. 4. In an embodiment, the control unit 826 can be comprised within the wind speed sensor 802 or the wind direction sensor 808.

In response to a received desired power output, the controller 804 can send control signals to the plurality of wind turbines 800 to control their instantaneous power output in accordance with the desired power output. This involves controlling or regulating the output by means of e.g. torque or power control, and/or pitch control or active stall control of rotors of the wind turbines 800 and/or stopping at least one of the turbine of the park.

Hence, stored data in the storage component 806, which can comprise the matrix described in FIG. 7, can be used to reduce the wind power plant 814 power output, for example as a percentage of the actual power in the wind. Consequently, a power buffer can be provided wherein the wind power plant 814 has the possibility of injecting more power into the grid if needed. In an embodiment, an anemometer can be provided for each wind turbine 800.

Figure 9:
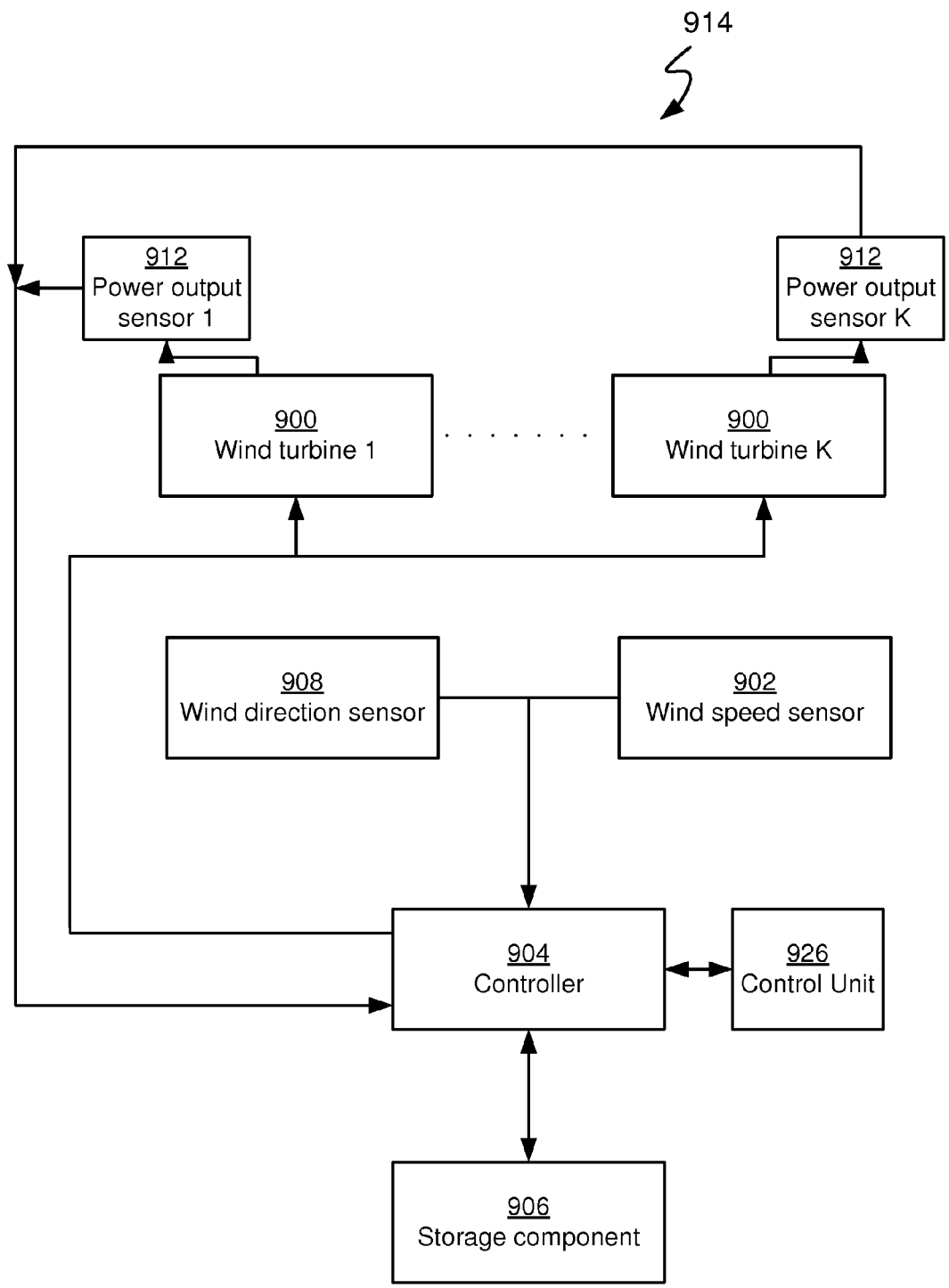
FIG. 9 is a block diagram of a wind power plant according to an embodiment of the invention.

FIG. 9 is a block diagram of a wind power plant according to an embodiment of the invention. The wind power plant 914 comprises a plurality of wind turbines 900, a wind direction sensor 908, a wind speed sensor 902, a controller 904, and a storage component 906. The reference numerals correspond to the corresponding reference numerals described with reference to FIG. 8. The wind power plant 914 further comprises a plurality of power output sensors 912, each power output sensor 912 being associated with a wind turbine 900, and a control unit 926.

When advantageously each wind turbine 900 operates at an upper limit capacity, each power output sensor 912 provides information to the controller 904 regarding power output value from the wind turbine 900 it is associated with. Thus, wind speed measured by the wind speed sensor 902 and wind direction measured by the wind direction sensor 908 can be associated with a power output value measured under these conditions.

The measured wind speed can be associated with a wind speed interval, as described above, and the wind direction can be associated with a wind sector, wherein the measured power output value can be stored in the storage component 906 such that e.g. the power output is associated with the wind speed and wind sector.

The storage component can comprise a data structure such as a matrix as described with reference to FIG. 7. The storage component 906 can comprise a plurality of matrices, e.g. one for each wind turbine 900 and/or one for the complete wind power plant 914 in which each stored power output value is a total power output from the wind power plant, i.e. an addition of the power output from all wind turbines 900. This can provide better control of an individual wind turbine 900 if an individual power output is to be controlled.

The measured power output from the power output sensors 912 can be stored in the storage component 906. The controller can retrieve previously stored information from the storage component 906 regarding an upper limit power output for the measured wind speed and wind direction. The power output values provided by the power output sensors 912 are advantageously stored in the storage component 906 when the wind turbines 900 operate at an upper limit capacity (i.e. in a non curtailed way), i.e. when delivering the full energy they can take from the wind.

The controller 904 is also arranged in an embodiment to receive desired power output from an external source such as a TSO.

The control unit 926 can quantize the measured wind speed and wind direction as described with reference to FIG. 4. In an embodiment, the control unit 926 can be comprised within the wind speed sensor 902 or the wind direction sensor 908.

In response to a received desired power output, the controller 904 can send control signals to the plurality of wind turbines 900 to control their instantaneous power output in accordance with the desired power output. This involves regulating the output by means of e.g. torque or power control, and/or pitch control and/or active stall control of rotors of the wind turbines 900 and/or stopping any wind turbine. Consequently, a power buffer can be provided and the wind power plant 914 has the possibility of injecting more power into the grid if needed.

Figure 10:
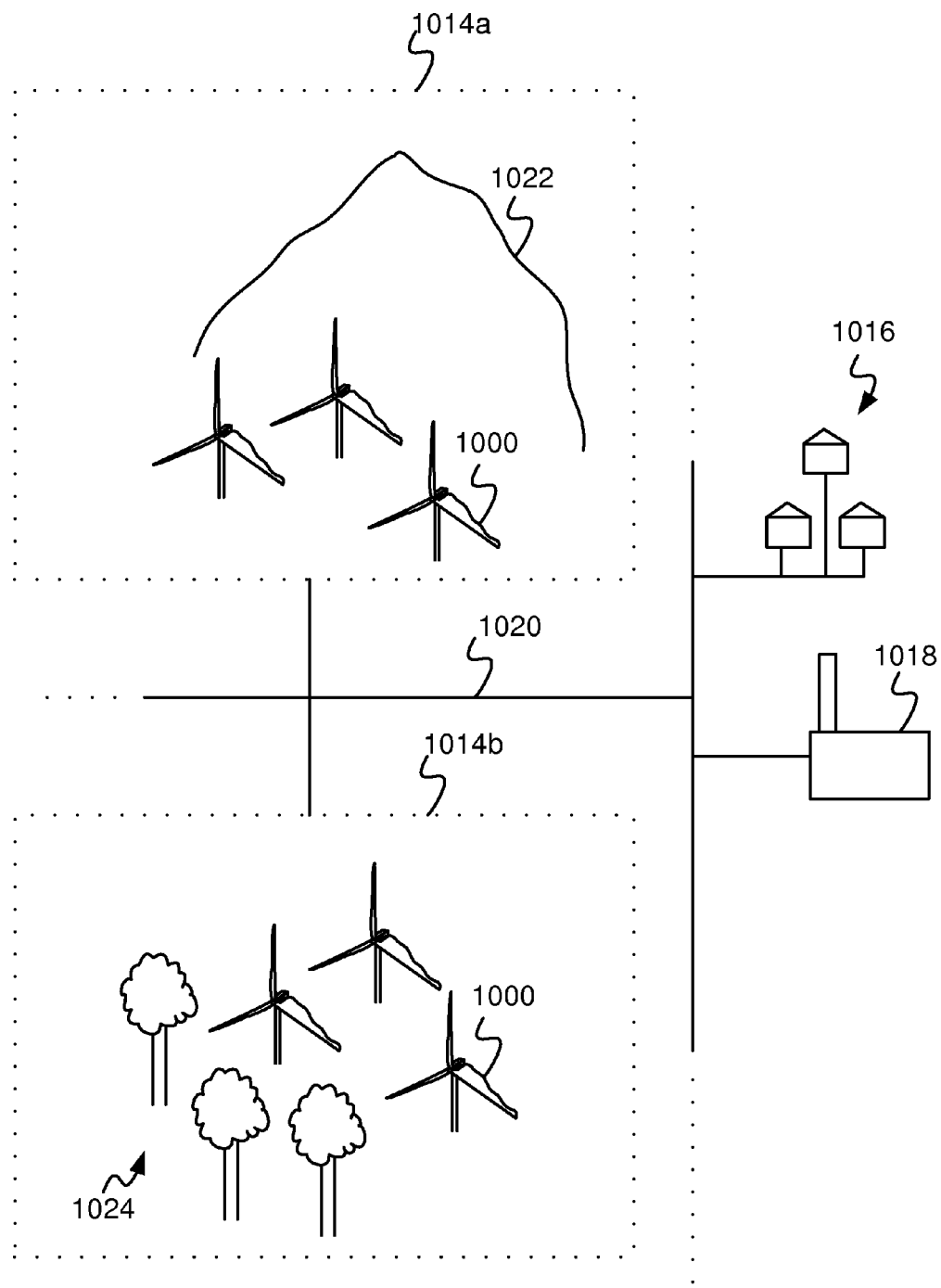
FIG. 10 shows wind power plants connected to a power grid according to an embodiment of the invention.

FIG. 10 shows wind power plants according to an embodiment of the invention, connected to a power grid. Wind power plants 1014a and 1014b are connected to a grid 1020, which is only partially illustrated.

Each wind power plants 1014a-b comprises wind turbines 1000, a wind speed sensor (not shown), a wind direction sensor (not shown), where each such device can e.g. be incorporated into one anemometer. Each wind power plants 1014a-b further comprises storage components (not shown) and controllers (not shown). In another embodiment these storage components and/or the controllers can be shared between the wind power plants 1014a-b.

During the process of filling the data structure of the invention, advantageously when the wind power plants 1014a-b operate at an upper limit capacity (i.e. in a non curtailed way), power output sensors (not shown) can each measure a power output value from each of the wind power plants 1014a-b (in another embodiment from each wind turbines 1000) and this information can be stored in each of the storage components together with the measured wind speed and wind direction that provided such a power output value, as described above.

During the process of running any wind power plant in a controlled way, notably curtailed way, wind speed and wind direction are measured and it is then possible to retrieve an earlier stored power output value corresponding to such a wind speed and wind direction: an expected upper limit power output at the same wind speed and wind direction can be determined.

In the vicinity of wind power plant 1014a there is a mountain 1022, and in the vicinity of wind power plant 1014b there is a forest 1024. Thus, even if wind power plants 1014a and 1014b have the same factory power output specifications, e.g. has the same number of identical wind turbines 1000 from the same manufacturer, the upper limit power output for a specific wind speed can be different depending on the wind direction.

If the trees 1024 grow, their influence on the wind power plant 1014b will be updated in the data structure as the process of filling the data structure will be conducted from time to time.

A power plant 1018 such as a nuclear power plant is also connected to the grid 1020 as are users 1016 of electric power. Transformation stations are not shown in FIG. 10. Consumption from the users 1016 may change and therefore how much power is needed from the grid 1020.

A difference between power plant 1018 and the wind power plants 1014a-b is that for power plant 1018 it is much easier to control the power output which it is able to inject to the grid 1020 at any moment in time (and to manage a power buffer to compensate an increase of the consumption of users 1016), whereas for the wind power plants 1014a-b, there are several unpredictable factors that will decide what upper limit power output these plants can deliver, such as wind speed and wind direction.

Figure 11:
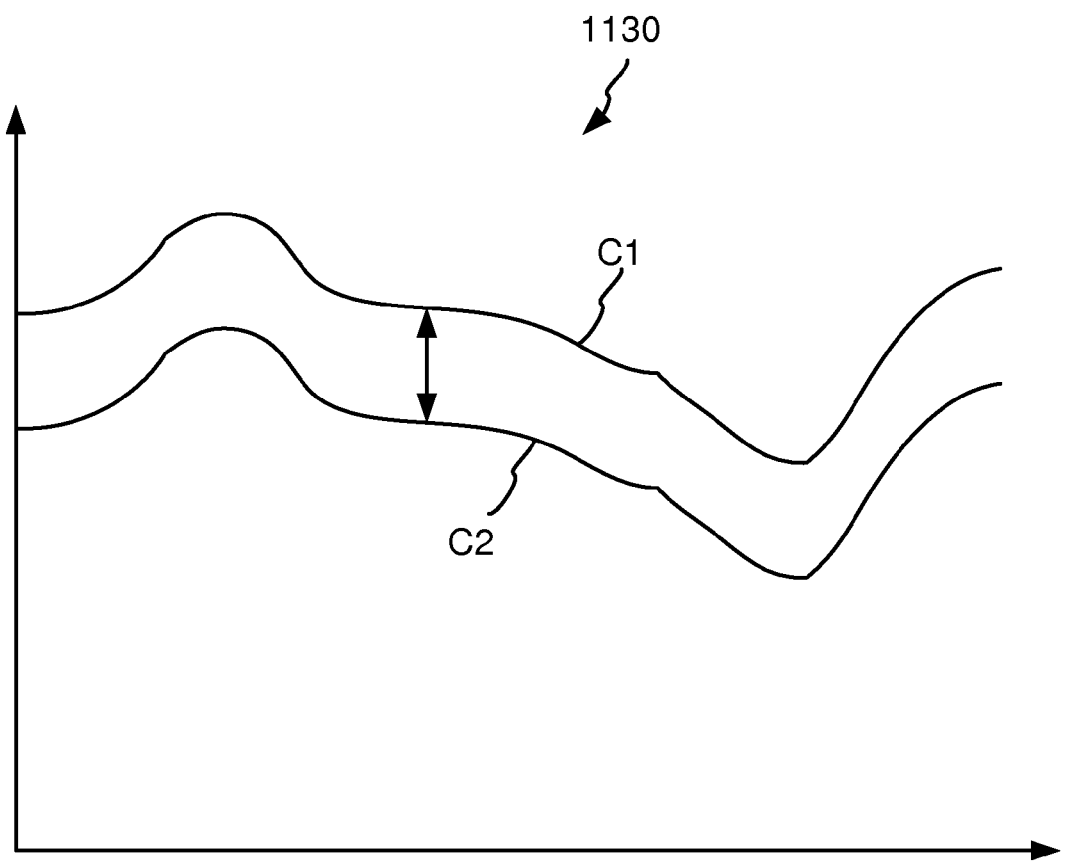
FIG. 11 shows an example of a graph illustrating power in the wind in relation to a controlled power output from a wind power plant according to an embodiment of the invention.

FIG. 11 shows an example of a graph 1130 illustrating power in the wind in relation to a controlled power output from a wind power plant according to an embodiment of the invention. The y-axis (ordinates) indicates power in e.g. watt, and the x-axis (abscissa) indicates time in e.g. seconds.

An upper curve C1 shows the power in the wind, i.e. for the wind power plant the available power possible to extract from the wind and convertible into electrical energy injectable into the grid (the upper limit power output possible). The upper curve C1 is not constant, as the power in the wind varies with wind speed and wind direction. A lower curve C2 shows the instantaneous power output from a wind power plant according to embodiments described above when the wind power plant is curtailed.

In this example, the arrows between the two curves indicate that there may be a constant difference between the power in the wind, which is thus the 100% of the available power (upper limit power output), and the curve C2, which is the controlled (or curtailed) output of the wind power plant. In this example C2 follows an energy curve of 90% of the power in the wind C1.

Thus, if needed, it is possible to inject more power into the grid on demand, by commanding the wind power plant to run at its upper limit power output from its curtailed running.

The wind power plant can be seen to provide an energy buffer, with power injectable into the grid on demand. Moreover, it may also be possible to know how much power it is possible to inject into the grid at any given time.

The invention claimed is:

1. A method for controlling an instantaneous power output from a wind power plant, the method comprising:
    determining a wind speed and a corresponding wind direction of a wind,
    providing a data structure comprising at least one previously determined power output value of the wind power plant, wherein the data structure describes a relationship between the power output value and said wind speed and said corresponding wind direction,
    determining an upper limit power output using the at least one previously determined power output value, and
    controlling the instantaneous power output delivered to the grid from the wind power plant according to a desired power output,
    wherein the desired power output establishes a power buffer based on said determined upper limit power output.

2. The method of claim 1, further comprising:
    determining a humidity of air in the wind,
    wherein the providing the data structure comprising the at least one previously determined power output value of the wind power plant determined at said wind speed in said wind direction at said humidity.

3. The method of claim 1, further comprising:
    determining a temperature of air in the wind,
    wherein the providing the data structure comprising the at least one previously determined power output value of the wind power plant determined at said wind speed in said wind direction at said temperature.

4. The method of claim 1, further comprising:
    determining a moving mass of air in the wind affecting the wind power plant,
    wherein the providing the data structure comprising the at least one previously determined power output value of the wind power plant determined at said wind speed in said wind direction when said moving mass of air in the wind was affecting the wind power plant.

5. The method of claim 1, wherein the data structure is a matrix comprising the at least one previously determined power output value is stored as a matrix element associated with the wind speed and the wind direction.

6. The method of claim 1, wherein the determining the wind direction comprises:
    associating the wind direction to a wind direction interval comprising said wind direction.

7. The method of claim 1, wherein the determining the wind speed comprises:
    associating the wind speed to a wind speed interval comprising said wind speed.

8. The method of claim 1, further comprising:
    determining a first power output value of the wind power plant associated with the wind speed and the wind direction, and
    storing the first determined power output value in the data structure.

9. The method of claim 8, further comprising:
    determining a second power output value of the wind power plant associated with the wind speed and the wind direction,
    determining an average power output value based on the first determined power output value and the second determined power output value, and
    storing the determined average power output value in the data structure.

10. The method of claim 9, wherein the storing the determined average power output value comprises replacing any previously stored value of the determined average power output value associated with the wind speed and wind direction.

11. The method of claim 8, wherein the first determined power output value is determined for a first wind turbine arranged in the wind power plant while taking into account an operating status of a second wind turbine arranged in the wind power plant.

12. The method of claim 9, wherein the determining the first determined power output value and the second determined power output value of the wind power plant comprises determining the first power output value and the second determined power output value associated with the wind speed and the wind direction at a determined humidity of air in the wind.

13. The method of claim 9, wherein the determining the first determined power output value and the second determined power output value of the wind power plant comprises determining the first power output value and the second determined power output value associated with the wind speed and the wind direction at determined temperature of air in the wind.

14. The method of claim 9, wherein the determining the first determined power output value and the second determined power output value of the wind power plant comprises determining the first power output value and the second determined power output value associated with the wind speed and the wind direction when a determined moving mass of air in the wind is affecting the wind power plant.

15. The method of claim 1, wherein the at least one previously determined power output value is determined at a substation level of the wind power plant.

16. The method of claim 1, wherein the controlling the instantaneous power output comprises controlling a pitch of rotors of wind turbines of the wind power plant.

17. The method of claim 1, further comprising: receiving a desired power output.

18. The method of claim 1, wherein the controlling the instantaneous power output from the wind power plant comprises maintaining a constant level for the instantaneous power output.

19. A wind power plant, comprising:
a wind speed sensor and a wind direction sensor determining a wind speed and a corresponding wind direction of a wind;
a storage component saving determined power output values of the wind power plant, each of the determined power output values being generated by the wind power plant, each of the determined power output values being saved with a relationship between the determined power output value and said wind speed and said corresponding wind direction; and
a controller retrieving, from the storage component, an upper limit power output value associated with a wind speed and a wind direction, said upper limit power output value being determined from at least one saved one of the determined power output values associated with the wind speed and the wind direction, and wherein the controller directs, in response to a computer program, an instantaneous power output delivered to a grid from the wind power plant according to a desired power output,
wherein the desired power output establishes a power buffer based on the upper limit power output value, and the computer program is stored on a non-transitory computer-readable storage medium of the wind power plant.

20. The wind power plant of claim 19, further comprising:
a control unit arranged to associate the wind direction to a wind direction interval comprising the wind direction.

21. The wind power plant of claim 19, further comprising:
a humidity sensor arranged to determine a humidity of air in the wind,
wherein the storage component is arranged to store the determined power output values associated with said humidity.

22. The wind power plant of claim 19, comprising:
a temperature sensor arranged to determine a temperature of the air in the wind,
wherein the storage component is arranged to store the determined power output values associated with said temperature.

23. A method for collecting local wind data for control of power output of a wind power plant, the method comprising:
determining a wind speed and a wind direction of a wind, wherein the wind speed and the wind direction representing the wind speed and wind direction that the wind power plant is subject to;
determining an associated wind direction interval of a plurality of wind direction intervals comprising said wind direction;
determining a power output value of the wind power plant including a relationship between the power output value and said wind speed and said wind direction interval;
storing the power output value including the relationship in an element of a matrix data structure, and
controlling the instantaneous power output delivered to a grid from the wind power plant according to a desired power output,
wherein the desired power output establishes a power buffer based on the determined power output value,
wherein the element being associated with the determined wind speed and the associated wind direction interval.

24. The method of claim 23, further comprising:
determining a humidity of air in the wind, and
associating the element of the matrix data structure with said humidity.

25. The method of claim 23, further comprising:
determining a temperature of air in the wind, and
associating the element of the matrix data structure with said temperature.

26. The method of claim 23, further comprising:
determining a moving mass of air in the wind affecting the wind power plant, and
associating the element of the matrix data structure with said moving mass of air.

27. The method of claim 23, further comprising determining an associated wind speed range comprising said wind speed.

28. The method of claim 23, further comprising curtailing the power output of the wind power plant based on the determined power output value.

29. The method of claim 23, wherein the plurality of wind direction intervals divides a horizontal plane into sectors of uniform angular width.

30. The method of claim 29, wherein a quantity of sectors being in a range from twelve (12) to eighteen (18).

* * * * *